US012643287B2

(12) United States Patent
Nguyen et al.

(10) Patent No.: US 12,643,287 B2
(45) Date of Patent: Jun. 2, 2026

(54) PHOTOCURABLE MATERIALS FOR THE PRODUCTION OF DENTAL PROSTHESES AND DEVICES

(71) Applicant: Pac-Dent, Inc., Brea, CA (US)

(72) Inventors: Minhdang Son Nguyen, Brea, CA (US); Daniel Wang, Brea, CA (US)

(73) Assignee: Pac-Dent, Inc., Brea, CA (US)

( * ) Notice: Subject to any disclaimer, the term of this patent is extended or adjusted under 35 U.S.C. 154(b) by 0 days.

(21) Appl. No.: 19/061,260

(22) Filed: Feb. 24, 2025

(65) Prior Publication Data

US 2025/0187262 A1 Jun. 12, 2025

Related U.S. Application Data

(63) Continuation-in-part of application No. PCT/US2023/031078, filed on Aug. 24, 2023.

(60) Provisional application No. 63/400,693, filed on Aug. 24, 2022.

(51) Int. Cl.
| | |
|---|---|
| *B29C 64/124* | (2017.01) |
| *B33Y 10/00* | (2015.01) |
| *B33Y 70/10* | (2020.01) |
| *B29K 33/00* | (2006.01) |
| *B29K 105/00* | (2006.01) |
| *B29K 505/02* | (2006.01) |
| *B29K 509/08* | (2006.01) |
| *B29L 31/00* | (2006.01) |
| *B33Y 80/00* | (2015.01) |

(52) U.S. Cl.
CPC ............ *B29C 64/124* (2017.08); *B33Y 10/00* (2014.12); *B33Y 70/10* (2020.01); *B29K 2033/08* (2013.01); *B29K 2105/0002* (2013.01); *B29K 2105/0032* (2013.01); *B29K 2105/0044* (2013.01); *B29K 2105/0094* (2013.01); *B29K 2505/02* (2013.01); *B29K 2509/08* (2013.01); *B29K 2995/0094* (2013.01); *B29L 2031/7536* (2013.01); *B33Y 80/00* (2014.12)

(58) Field of Classification Search
None
See application file for complete search history.

(56) References Cited

U.S. PATENT DOCUMENTS

| | | | | |
|---|---|---|---|---|
| 4,192,795 | A | * | 3/1980 | Madhavan ............. A61K 6/887 |
| | | | | 523/466 |
| 2007/0100019 | A1 | | 5/2007 | Sun |
| 2014/0131908 | A1 | * | 5/2014 | Sun .................... A61C 13/0013 |
| | | | | 264/16 |
| 2016/0310368 | A1 | * | 10/2016 | Peez ...................... A61K 6/889 |
| 2016/0324730 | A1 | * | 11/2016 | Lee .................... A61C 13/0004 |
| 2020/0140614 | A1 | | 5/2020 | Parkar et al. |
| 2020/0197138 | A1 | | 6/2020 | Parkar et al. |
| 2023/0272139 | A1 | * | 8/2023 | Chisholm ......... C08F 222/1063 |
| | | | | 522/104 |

FOREIGN PATENT DOCUMENTS

| | | |
|---|---|---|
| CN | 112367959 | 2/2021 |
| WO | WO2019043056 | 3/2019 |

OTHER PUBLICATIONS

International Search Report and Written Opinion dated Dec. 18, 2023 from IA PCT/US2023/031078.

* cited by examiner

*Primary Examiner* — Robert S Jones, Jr.
*Assistant Examiner* — Christiaan Roelofse
(74) *Attorney, Agent, or Firm* — Crockett & Crockett, PC; K. David Crockett, Esq.

(57) ABSTRACT

A resin based material whose composition includes a light-curable mixture of monomers of no more than 35 wt. % of an ethoxylated difunctional bisphenol A dimethacrylate; of no more than 10 wt. % of a methacrylate monomer; of no more than 10 wt. % of a difunctional urethane acrylate; of no more than 0.1 wt. % of an optical brightener; of no more than 5 wt. % of silica particles having methacrylate functionalization layers and having an average particle size of less than about 200 nm; of having more than 40 wt. % of an inert glass; of no more than 15 wt. % of a heavy metal oxide; of no more than 2.5 wt. % of an ultraviolet/visible (UV/Vis) light-photo-polymerization initiator; a colorant; and a stabilizer.

18 Claims, No Drawings

PHOTOCURABLE MATERIALS FOR THE PRODUCTION OF DENTAL PROSTHESES AND DEVICES

This application is a continuation-in-part of PCT Application PCT/US2023/031078, filed Aug. 24, 2023, which claims benefit of U.S. Provisional Application 63/400,693, filed Aug. 24, 2022. The entirety of U.S. Provisional Application 63/400,693 hereby incorporated by reference. The entirety of PCT Application PCT/US2023/031078 is hereby incorporated by reference.

FIELD OF THE INVENTIONS

The inventions described below relate to the field of photocurable materials for additive manufacturing of dental prostheses.

BACKGROUND

Dental prostheses such as denture bases, denture teeth, partial dentures, crowns, inlays and onlays and other dental restorations, and dental filler materials for restoration of natural teeth are made with additive manufacturing techniques and the application of UV or visible light to photocurable material.

Additive manufacturing is a general description of the process where materials are added successively by layers to produce the final part. This is also known as three-dimensional printing. Photocurable materials may be used in several methods of additive manufacturing including stereolithography (SLA), digital light processing (DLP), and ink jet printing with single or multiple jets.

In one application using SLA, a resin mixture is poured into a vat and the UV/visible light applied to the resin mixture to cure the resin is controlled by a mirror to focus the light exactly where the resin is to be cured and solidified. The vat is lowered on an associated printing plate and is raised layer by layer with repeated curing to produce a final part. Alternatively, with DLP, UV/visible light applied to the resin mixture over an entire cross section of the part is cured at once and repeated layer by layer.

Another alternative involves a method called continuous liquid interface production (CLIP) in which a semi-permeable oxygen layer or window is created to allow continuous flow of resin into an area where the resin is cured continuously.

Ink jet printing uses an ink jet or multi jet printer, to print uncured resin onto a plate. The resin is cured as it exits the nozzle to produce a solid layer. This printing is done continuously until the final form of a part is achieved. Multiple jets may be loaded with different materials and operated in conjunction with each other to form a part out of different compositions of materials.

A number of resin formulations are currently available for use in these printing systems. However, improvements in materials for dental prostheses are needed to facilitate increased clinical longevity and reliability and improved mechanical and physical properties.

SUMMARY

The devices and methods described below provide for (1) a new photocurable material, useful in additive manufacturing techniques, to make dental prostheses such as denture bases, denture teeth, partial dentures, crowns, inlays and onlays and other dental restorations, or to make dental filler materials for restoration of natural teeth, (2) dental prostheses and products such as denture bases, denture teeth, partial dentures, crowns, inlays and onlays and other dental restorations, or to make dental filler materials for restoration of natural teeth, and natural teeth restored with the photocurable material, and (3) a method of making dental prostheses with the photocurable material and additive manufacturing techniques, all with improved properties such as flexural strength, fracture toughness, and/or wear rate.

The new photocurable material is a resin matrix including an ethoxylated difunctional bisphenol A dimethacrylate; a methacrylate monomer, a difunctional urethane acrylate and a stabilizer. The new photocurable material may alternatively be formulated with a resin matrix comprising an ethoxylated difunctional bisphenol A dimethacrylate; a methacrylate monomer, a difunctional urethane acrylate and a stabilizer. The resin of the photocurable material is composed of at least one kind of dimethacrylate; and at least one kind of methacrylate monomer; and at least one kind of difunctional urethane acrylate.

Dental prostheses such as denture bases, denture teeth, crowns, overlays, onlays and other dental restorations may be fabricated with the photocurable material, using additive manufacturing methods, to create dental prostheses comprising a cured material resulting from photocuring the photocurable material.

The material may be used in a method of manufacturing dental prostheses or restoring natural teeth with additive manufacturing techniques. The material and method of manufacture provides dental prostheses comprising the cured dental composite obtained by photocuring the new photocurable material.

DETAILED DESCRIPTION OF THE INVENTIONS

The improved photocurable material may consist of no more than 35 wt. % of at least one kind of ethoxylated difunctional bisphenol A dimethacrylate; of no more than 10 wt. % of at least one kind of methacrylate monomer; of no more than 5 wt. % of at least one kind of difunctional urethane acrylate; of no more than 0.1 wt. % of at least one kind of optical brightener; of no more than 2 wt. % of at least one kind of silica particles having methacrylate functionalization layers and having an average particle size of less than about 200 nm; of no more than 50 wt. % of at least one kind of inert glass; of no more than 10 wt. % of at least one kind of heavy metal oxide; of no more than 1 wt. % of at least one kind of ultraviolet/visible (UV/Vis) light-photo polymerization initiator; at least one colorant; and at least one stabilizer. The photocurable material is in a liquid state and attains a solid state after curing. The viscosity of a liquid state of the photocurable material is less than 2000 centipoise (cps) (2 Pascal-second) at room temperature or 25° C.

Several different methacrylates may be used, alone or in combination with ethoxylated difunctional bisphenol A dimethacrylate and other methacrylates. Additional multifunctional methacrylates that may be used in the photocurable resin include ethylene glycol dimethacrylate, diethylene glycol dimethacrylate, polyethylene glycol dimethacrylate, 2,2 bis[4-(methacryloxy ethoxy)phenyl]propane, tricyclodecane dimethanol dimethacrylate, 1,10-decandiol dimethacrylate, 1,6-hexane-diol dimethacrylate, neopentyl glycol dimethacrylate, trimethyolpropane trimethacrylate, ethoxylated trimethyolpropane trimethacrylate, ditrimethyolpropane tetramethacrylate, dipentaerythritol pentamethacrylate, ethyoxylated pentaerythritol tetramethacrylate, propoxylated glyceryl trimethacrylate, and propoxylated trimethylolpropane trimethacrylate.

A photocurable component comprising at least one kind of ultraviolet/visible (UV/Vis) light-photo-polymerization initiator is used for curing of the part. A preferred light-photo-polymerization initiator includes 1-2 wt. % of 2-hydroxy-4-methoxybenzophenone, 1.0-2.5 wt. % diphenyl(2, 4,6-trimethylbenzoyl) phosphine oxide with less than 0.1 wt. % of stabilizer Butylated hydroxytoluene. Other photoinitiators that may be used include bis(2,4,6-trimethylbenzoyl)phenyl phosphine oxide, 2-hydroxy-2-methyl-1-phenyl 1-propanone, and benzophenones (BP).

Other stabilizers that may be used in the photocurable resin include 4-methoxyphenol, phenothiazine, bis(tridecyl) thiodipropionate, and other compounds that prevent generation and propagation of amine complexes.

Optionally, an optical brightener and a colorant may be included in the resin material. Other colorants based on a variety of metal oxides may be used to impart a range of colors to the resin material. Examples include but are not limited to various types of iron oxides, copper oxides, chromium oxides, cobalt oxides, zinc oxides, nickel oxides, vanadium oxide, cerium oxide, and other metals and various oxidation states. For example, the composition may include <0.1 wt. % of optical brightener and <0.1 wt. % of iron oxides colorant.

The material also contains at least one kind of silica particle having methacrylate functionalization layers and having an average particle size of less than about 200 nm. In one composition, the filler material consists of no more than 5 wt. % of at least one kind of silica particles having methacrylate functionalization layers and having an average particle size of less than about 200 nm; of having more than 40 wt. % of at least one kind of inert glass; and of no more than 15 wt. % of at least one kind of heavy metal oxide. In one composition, filler also includes 40-60 wt. % of barium aluminoborosilicate, 0-15 wt. % of ytterbium trifluoride, and 1-5 wt. % of fumed silicon dioxide.

The photocurable material includes fillers which may comprise quartz, fused silica, chemically derived silica, pyrogenic silica, colloidal silica, aluminous silica, glass ceramics, soda lime glasses, borosilicate glasses, strontium glasses, zinc glass, fluoro-aluminate glass, and various mixtures of these components. Filler particles may be spherical, irregular, needle like, dense, partially porous, porous, or a mixture thereof.

The filler particles may be functionally coated to improve adherence to and suspension in the resin matrix. Different types of silane coatings that may be used to functionally coat the filler particles include dimethyldichlorosilane, vinyltrichloro-silane, methyltrimethoxy-silane, dimethyldimethoxy-silane, trimethylchloro-silane, phenyltrimethoxy-silane, diphenyldimethoxy-silane, methyltriethoxy-silane, dimeethyldiethoxy-silane, vinyl-trimethoxy-silane, methyldichlorosilane, diethylsilane, and other types of silane. Filler may consist of particles in a size range of up to 20 microns but typically consists of particles in a size range of less than 10 microns and preferably consist of particles in a size range of less than 5 microns, or 5 microns or less. They may be a mixture of sizes or of a uniform size. The filler material may comprise a first plurality of particles with sizes in the range of 10 to 20 microns, a second plurality of particles with sizes in the range of 5 to 10 microns, and a third plurality of particles with sizes smaller than 5 microns, preferably without a significant number of larger particles. In another embodiment, the filler material may consist of particles in the range of 5 microns and smaller, preferably with a median size of 3 microns, without a significant number of larger particles. In another embodiment, filler material may consist of a first plurality of particles with sizes in the range of 10 to 20 microns, a second plurality of particles with sizes in the range of 5 to 10 microns, and a third plurality of particles with sizes smaller than 5 microns, where the third plurality of particles has a median size of 3 microns, where, again, the filler material does not include a significant number of larger particles.

In another embodiment, the glass particles in the filler material may consist of particles in the range of 5 microns and smaller, preferably with a median size of 3 microns, without a significant number of larger particles. In another embodiment, the glass particles in the filler material may consist of a first plurality of glass particles with sizes in the range of 10 to 20 microns, a second plurality of glass particles with sizes in the range of 5 to 10 microns, and a third plurality of glass particles with sizes smaller than 5 microns. The third plurality of glass particles may have a median size of 3 microns, where the entire population of glass particles does not include a significant number of larger glass particles, such that the filler material consists of particles with sizes in the range of 20 microns or less, without a significant number of larger particles.

Heavy metal oxides may include those metals having an atomic number that is greater than 20 and/or a density greater than 5 g/cm$^3$ such as zinc, cerium, yttrium, strontium, barium, zirconium, hafnium, niobium, tantalum, tungsten, bismuth, molybdenum, tin or combinations thereof.

The viscosity of the composition is measured using a Brookfield DV-III Ultra Programmable Rheometer equipped with a CPA 51Z spindle at a speed to achieve 10% torque. One preferred viscosity achieved by design of the mixture is based on the inclusion of at least one kind of ethoxylated difunctional bisphenol A dimethacrylate, at least one kind of methacrylate monomer, at least one kind of difunctional urethane acrylate, at least one kind of silica particles, at least one kind of optical brightener, at least one kind of inert glass, at least one kind of heavy metal oxide, at least one kind of UV/Vis light-photo-polymerization initiator, at least one colorant, and at least one stabilizer, and is less than 1000 centipoise (cps) at room temperature or 25° C.

The viscosity of the photocurable material may range up to 2000 centipoise (cps) at room temperature or 25° C. but will vary depending upon the exact ratio of various monomer components and filler components. Lower viscosity resins such as triethylene glycol dimethacrylate, when used in higher ratios, will decrease the viscosity, as will lower concentrations of filler.

Various properties of the new photocurable material were tested and compared to existing materials used for denture prostheses. The tested embodiment included the components described above.

Biaxial flexural strength of the tested embodiment of the new photocurable material and other denture materials was determined according to ISO Standard 6872-2015 and is presented in Table 1. Biaxial flexural strength of the tested embodiment of the new photocurable material for teeth is presented in Table 2.

TABLE 1

Biaxial Flexural Strength of Printed
Materials for Denture Bases

| Material | Biaxial Flexure Strength (MPa) | Flexural Modulus (GPa) |
|---|---|---|
| Tested Denture Material | 132.8 ± 8.6 | 1.6 ± 0.3 |
| Lucicone Digital Print | 115.8 ± 5.8 | 1.5 ± 0.3 |
| FormLabs Material | 122.4 ± 213.1 | 1.42 ± 0.2 |
| Dentca Material | 128.6 ± 10.0 | 1.15 ± 0.3 |

TABLE 2

Biaxial Flexural Strength of Printed Tooth
Restorations and Denture Teeth

| Material | Biaxial Flexure Strength (MPa) | Flexural Modulus (GPa) |
|---|---|---|
| Tested Tooth Material | 174.33 ± 8.33 | 6.5 ± 0.9 |
| Bego Permanent Material | 122.3 ± 34.8 | 4.6 ± 0.9 |
| Bego Temp Material | 103.4 ± 21.9 | 1.9 ± 0.7 |
| Dentca Temp Material | 105.6 ± 34.0 | 2.0 ± 0.2 |
| Printed Tooth Material | 115.2 ± 31.3 | 1.9 ± 0.3 |

The fracture toughness of the tested embodiment of the new photocurable material for tooth materials was determined according to ISO Standard 2079 and is presented in Table 3.

TABLE 3

Fracture Toughness of Tooth Materials

| Material | Mean Fracture Toughness Kmax (MPa · m$^{0.5}$) |
|---|---|
| Tested Material | 1.4 ± 0.1 |
| Cerasmart Material | 0.87 ± 0.08 |
| Lava Ultimate Material | 1.0 ± 0.09 |
| Bego Permanent Material | 0.8 ± 0.07 |
| Bego Temp Material | 0.75 ± 0.08 |

Wear of the new photocurable material for tooth materials was determined using a pin-on-plate method where a cylinder of the invention material was run against a tooth substitute plate material under a 400-gram load with continuous water flow. The wear rates were determined for the new photocurable material and compared to existing materials currently in clinical use. Wear rates are shown in Table 4.

TABLE 4

Mean Wear Rate of Tooth Materials

| Material | Weight Loss mg/million cycles | Height Loss mm/million cycles |
|---|---|---|
| Tested Tooth | 1.4 | 0.11 |
| Bego Permanent Tooth | 1.9 | 0.14 |
| Dentca C&B Tooth | 4.3 | 0.21 |

TABLE 4-continued

Mean Wear Rate of Tooth Materials

| Material | Weight Loss mg/million cycles | Height Loss mm/million cycles |
|---|---|---|
| Shofu HC Machinable Tooth Material | 24.4 | 3.5 |

The photocurable material described above is intended for use in creating dental prostheses comprising a cured component created by additive manufacturing from the photocurable material. These prostheses may be made with a method of printing a dental prosthesis using the photocurable material in any additive manufacturing technique, including photocuring the photocurable material.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A photocurable material comprising:
an ethoxylated difunctional bisphenol A dimethacrylate, not exceeding 35 wt. % of the photocurable material;
a methacrylate monomer, not exceeding 10 wt. % of the photocurable material;
a difunctional urethane acrylate not exceeding 10 wt. % of the photocurable material;
an optical brightener not exceeding 0.1 wt. % of the photocurable material;
filler material comprising:
silica particles having methacrylate functionalization layers and having an average particle size of less than about 200 nm, said silica particles not exceeding 5 wt. % of the photocurable material;
an inert glass in an amount exceeding 40 wt. % of the photocurable material;
a heavy metal oxide not exceeding 15 wt. % of the photocurable material; and
an ultraviolet/visible (UV/Vis) light-photo-polymerization initiator not exceeding 2.5 wt. % of the photocurable material; wherein
the filler material comprises a first plurality of particles with sizes in the range of 10 to 20 microns, a second plurality of particles with sizes in the range of 5 to 10 microns, and a third plurality of particles with sizes smaller than 5 microns.

2. A photocurable material comprising:
an ethoxylated difunctional bisphenol A dimethacrylate, not exceeding 35 wt. % of the photocurable material;
a methacrylate monomer, not exceeding 10 wt. % of the photocurable material;
a difunctional urethane acrylate not exceeding 10 wt. % of the photocurable material;
an optical brightener not exceeding 0.1 wt. % of the photocurable material;
filler material comprising:
silica particles having methacrylate functionalization layers and having an average particle size of less than about 200 nm, said silica particles not exceeding 5 wt. % of the photocurable material;

an inert glass in an amount exceeding 40 wt. % of the photocurable material;

a heavy metal oxide not exceeding 15 wt. % of the photocurable material; and an ultraviolet/visible (UV/Vis) light-photo-polymerization initiator not exceeding 2.5 wt. % of the photocurable material; wherein the inert glass of the filler material comprises a first plurality of inert glass particles with sizes in the range of 10 to 20 microns, a second plurality of inert glass particles with sizes in the range of 5 to 10 microns, and a third plurality of inert glass particles with sizes smaller than 5 microns.

3. The photocurable material according to claim 1 further comprising:

a colorant; and a stabilizer.

4. The photocurable material according to claim 1 wherein:

the viscosity of the photocurable material is less than 2000 centipoise (cps) at room temperature or 25° C.

5. The photocurable material according to claim 1 wherein:

the viscosity of the photocurable material is less than 2000 centipoise (cps) at room temperature or 25° C.

6. The photocurable material according to claim 1 wherein the methacrylate monomer comprises one or more of:

ethylene glycol dimethacrylate, diethylene glycol dimethacrylate, polyethylene glycol dimethacrylate, 2,2 bis [4-(methacryloxyethoxy)phenyl]propane, tricylodecane dimethanol dimethacrylate, 1,10-decandiol dimethacrylate, 1,6-hexanediol dimethacrylate, neopentyl glycol dimethacrylate, trimethyolpropane trimethacrylate, ethoxylated trimethyolpropane trimethacrylate, ditrimethyolpropane tetramethacrylate, dipentaerythritol pentamethacrylate, ethyoxylated pentaerythritol tetramethacrylate, propoxylated glyceryl trimethacrylate, propoxylated trimethylolpropane trimethacrylate.

7. A photocurable material according to claim 1 further comprising:

1-2 wt. % of 2-hydroxy-4-methoxybenzophenone, 1.0-2.5 wt. % diphenyl(2,4,6-trimethylbenzoyl) phosphine oxide, and a stabilizer comprising butylated hydroxytoluene in an amount not exceeding 0.1 wt. % of the photocurable material.

8. A photocurable material according to claim 1 further comprising a stabilizer which comprises one or more of:

bis(2,4,6-trimethylbenzoyl)phenyl phosphine oxide, 2-hydroxy-2-methyl-1-phenyl-1-propanone, and benzophenones (BP), 4-methoxyphenol, phenothiazine, or bis(tridecyl)thiodipropionate.

9. A photocurable material according to claim 3 wherein the colorant comprises one or more of:

iron oxides, copper oxides, chromium oxides, cobalt oxides, zinc oxides, nickel oxides, vanadium oxide, and cerium oxide.

10. A photocurable material according to claim 1 wherein the filler material comprises:

40-60 wt. % of barium aluminoborosilicate; and 0-15 wt. % of ytterbium trifluoride, and 1-5 wt. % of fumed silicon dioxide.

11. A photocurable material according to claim 1 wherein the filler material comprises one or more of:

quartz, fused silica, chemically derived silica, pyrogenic silica, colloidal silica, aluminous silica, glass ceramics, soda lime glasses, borosilicate glasses, strontium glasses, zinc glass, and fluoroaluminate glass.

12. A photocurable material according to claim 1 wherein the filler material comprises particles functionally coated with a silane coating, said silane coating comprising one or more of:

dimethyldichlorosilane, vinyltrichlorosilane, methyltrimethoxysilane, dimethyldimethoxysilane, trimethylchlorosilane, phenyltrimethoxysilane, diphenyldimethoxysilane, methyltriethoxysilane, dimethyldiethoxysilane, vinyltrimethoxysilane, methyldichlorosilane, and diethylsilane.

13. A photocurable material according to claim 1 wherein the filler material consists of particles with sizes in the range of 20 microns or less.

14. A photocurable material according to claim 1 wherein the filler material comprises:

heavy metal oxides having an atomic number that is greater than 20 and/or a density greater than 5 g/cm3.

15. A photocurable material according to claim 1 wherein the filler material comprises one or more of:

zinc, cerium, yttrium, strontium, barium, zirconium, hafnium, niobium, tantalum, tungsten, bismuth, molybdenum and tin.

16. A photocurable material according to claim 1 wherein the photocurable material has a viscosity less than 2000 centipoise (cps) at room temperature or 25° C.

17. A dental prosthesis comprising a cured component created by additive manufacturing from the photocurable material of claim 1.

18. A method of printing a dental prosthesis using the photocurable material of claim 1 in an additive manufacturing technique including photocuring the photocurable material.

* * * * *